(12) United States Patent
Olesnavich et al.

(10) Patent No.: US 10,850,608 B2
(45) Date of Patent: Dec. 1, 2020

(54) VAPOR PRESSURE SENSOR ASSEMBLY

(71) Applicant: Eaton Intelligent Power Limited, Dublin (IE)

(72) Inventors: Michael Olesnavich, Bloomfield Hills, MI (US); Ron Sexton, South Lyon, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/597,482

(22) Filed: Oct. 9, 2019

(65) Prior Publication Data
US 2020/0031220 A1    Jan. 30, 2020

Related U.S. Application Data

(63) Continuation of application No. PCT/US2018/026849, filed on Apr. 10, 2018.

(60) Provisional application No. 62/483,744, filed on Apr. 10, 2017.

(51) Int. Cl.
*B60K 15/00* (2006.01)
*B60K 15/035* (2006.01)
*G01L 19/00* (2006.01)
*F02M 69/46* (2006.01)

(52) U.S. Cl.
CPC .... *B60K 15/03504* (2013.01); *G01L 19/0038* (2013.01); *B60K 2015/03514* (2013.01); *B60Y 2400/306* (2013.01); *F02M 69/462* (2013.01); *F02M 2200/247* (2013.01)

(58) Field of Classification Search
CPC ............. F02M 55/08; F02M 2200/247; F02M 69/462; F02M 69/48; B60K 2015/03467; B60K 15/03504
See application file for complete search history.

(56) References Cited

U.S. PATENT DOCUMENTS

| | | | |
|---|---|---|---|
| 5,789,679 A | 8/1998 | Koshimizu et al. | |
| 7,574,921 B2 | 8/2009 | Fessele et al. | |
| 8,002,315 B2* | 8/2011 | Engle | G01K 1/14 137/557 |
| 8,210,037 B2* | 7/2012 | Christoph | G01D 11/30 73/431 |
| 10,024,747 B2* | 7/2018 | Russell | G01L 19/147 |

(Continued)

FOREIGN PATENT DOCUMENTS

| | | |
|---|---|---|
| JP | H06248973 A | 9/1994 |
| JP | 2003003912 A | 1/2003 |

OTHER PUBLICATIONS

International Search Report and Written Opinion for International Application No. PCT/US2018/026849 dated Jul. 23, 2018.

*Primary Examiner* — Thomas N Moulis
(74) *Attorney, Agent, or Firm* — RMCK Law Group PLC

(57) ABSTRACT

A sensor adapter assembly configured to couple a vapor pressure sensor to a fuel tank includes a base housing configured to couple to the fuel tank, and an insert adapter coupled to the base housing. The insert adapter defines a sensor insertion aperture configured to provide fluid communication to a space inside the fuel tank. The insert adapter is configured to couple to the vapor pressure sensor such that at least a portion of the vapor pressure sensor extends through the sensor insertion aperture into the space inside the fuel tank.

17 Claims, 4 Drawing Sheets

(56) References Cited

U.S. PATENT DOCUMENTS

| | | | |
|---|---|---|---|
| 2007/0272028 A1* | 11/2007 | Fujimoto | G01L 19/0007 73/756 |
| 2009/0126694 A1* | 5/2009 | Ritz | F02M 37/0011 123/495 |
| 2015/0107700 A1 | 4/2015 | Walkowski | |
| 2018/0252606 A1* | 9/2018 | Kishimoto | G01L 9/0054 |

* cited by examiner

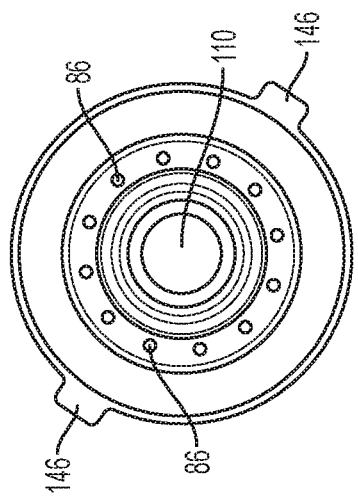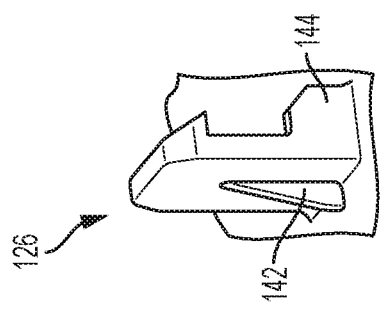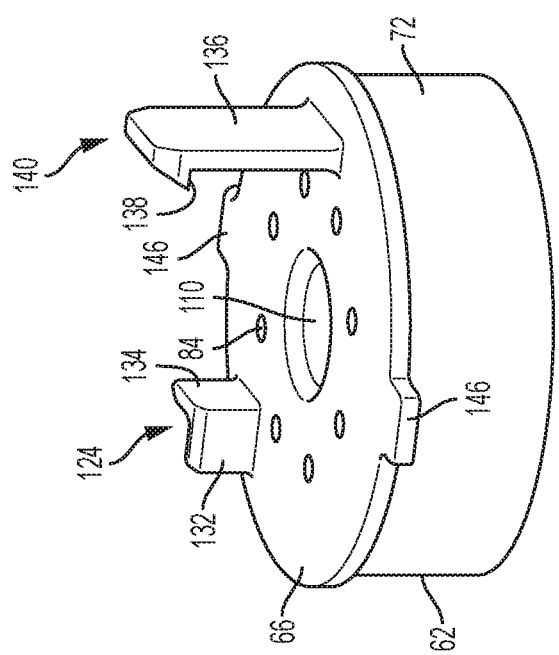

VAPOR PRESSURE SENSOR ASSEMBLY

CROSS REFERENCE TO RELATED APPLICATIONS

This application is a continuation of International Application No. PCT/US2018/026849 filed Apr. 10, 2018, which claims priority to U.S. Provisional Application No. 62/483,744 filed on Apr. 10, 2017. The disclosure of the above application is incorporated herein by reference.

FIELD

The present disclosure relates generally to fuel vapor recovery systems and, more particularly, to a vapor pressure sensor adapter for coupling a vapor pressure sensor to a fuel tank.

BACKGROUND

Some vehicles are equipped with a fuel vapor recovery system to capture and store vaporized hydrocarbons released from a fuel tank, for example, during refueling. The vaporized hydrocarbons may be stored in a fuel vapor storage canister packed with an adsorbent such as charcoal or carbon. At a later time when the vehicle engine is in operation, the fuel vapor recovery system may use a vacuum or pressure to purge the vapors into an intake manifold of the engine for use as fuel. The purge flow vacuum or pressure may be generated by one or more pumps and/or ejectors or by pressures in in the engine intake manifold. The fuel vapor recovery system may include a vapor pressure sensor to monitor fuel tank pressure to determine if a leak or problem exists in the fuel vapor recovery system. However, if the vapor pressure sensor is located distant from the fuel tank, such as on a vapor line to the canister or the canister itself, the sensor may give inaccurate readings if the vapor line is pinched or otherwise impeded.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In one aspect, a sensor adapter assembly configured to couple a vapor pressure sensor to a fuel tank is provided. The assembly includes a base housing configured to couple to the fuel tank, and an insert adapter coupled to the base housing. The insert adapter defines a sensor insertion aperture configured to provide fluid communication to a space inside the fuel tank. The insert adapter is configured to couple to the vapor pressure sensor such that at least a portion of the vapor pressure sensor extends through the sensor insertion aperture into the space inside the fuel tank.

In addition to the foregoing, the described assembly may include one or more of the following features: a clip extending outwardly from an upper surface of the insert adapter, the clip configured to engage the vapor pressure sensor to maintain coupling between the vapor pressure sensor and the insert adapter; and an anti-rotation tab extending outwardly from an upper surface of the insert adapter, the anti-rotation tab configured to abut against the vapor pressure sensor when the vapor pressure sensor is coupled to the insert adapter to facilitate preventing relative rotation between the vapor pressure sensor and the insert adapter.

In addition to the foregoing, the described assembly may include one or more of the following features: wherein the base housing is overmolded over at least a portion of the insert adapter; wherein a seal is coupled to the insert adapter and the base housing is overmolded over the seal; wherein the seal includes a seal portion overmolded over a plate portion, and wherein the seal portion includes a pair of seal tips sealed against the insert adapter to provide a fluid seal between the base housing and the insert adapter.

In addition to the foregoing, the described assembly may include one or more of the following features: wherein the base housing comprises a receiving aperture receiving at least a portion of the insert adapter, an upper flange, and a lower flange; wherein the base housing further comprises a plurality of projections extending upwardly from the upper flange and an upper surface of the base housing, the plurality of projections configured to extend into a plurality of apertures formed in the insert adapter to facilitate preventing relative rotation between the base housing and the insert adapter; and wherein the insert adapter comprises a lower adapter portion coupled to the base housing and having an inner rim and an outwardly extending flange, the inner rim defining the sensor insertion aperture, and the outwardly extending flange extending radially outward of the inner rim, and an upper adapter portion configured to couple to the vapor pressure sensor.

In another aspect, a vapor pressure sensor assembly configured to couple to a vehicle fuel tank is provided. The assembly includes a base housing configured to couple to the fuel tank, an insert adapter coupled to the base housing, the insert adapter defining a sensor insertion aperture configured to provide fluid communication to a space inside the fuel tank, and a vapor pressure sensor removably coupled to the insert adapter such that at least a portion of the vapor pressure sensor extends through the sensor insertion aperture into the space inside the fuel tank.

In addition to the foregoing, the described assembly may include one or more of the following features: a clip extending outwardly from an upper surface of the insert adapter, the clip configured to engage the vapor pressure sensor to maintain coupling between the vapor pressure sensor and the insert adapter; and an anti-rotation tab extending outwardly from an upper surface of the insert adapter, the anti-rotation tab configured to abut against the vapor pressure sensor when the vapor pressure sensor is coupled to the insert adapter to facilitate preventing relative rotation between the vapor pressure sensor and the insert adapter.

In addition to the foregoing, the described assembly may include one or more of the following features wherein the base housing is overmolded over at least a portion of the insert adapter, and wherein a seal is coupled to the insert adapter and the base housing is overmolded over the seal; and wherein the seal includes a seal portion overmolded over a plate portion, and wherein the seal portion includes a pair of seal tips sealed against the insert adapter to provide a fluid seal between the base housing and the insert adapter.

In addition to the foregoing, the described assembly may include one or more of the following features: wherein the base housing comprises a receiving aperture receiving at least a portion of the insert adapter, an upper flange, and a lower flange; wherein the base housing further comprises a plurality of projections extending upwardly from the upper flange and an upper surface of the base housing, the plurality of projections configured to extend into a plurality of apertures formed in the insert adapter to facilitate preventing relative rotation between the base housing and the insert adapter; and wherein the insert adapter comprises a lower adapter portion coupled to the base housing and having an inner rim and an outwardly extending flange, the inner rim defining the sensor insertion aperture, and the outwardly extending flange extending radially outward of the inner rim, and an upper adapter portion configured to couple to the vapor pressure sensor.

In addition to the foregoing, the described assembly may include one or more of the following features: wherein the base housing is overmolded over at least a portion of the insert adapter and a seal, wherein the seal includes a seal portion overmolded over a plate portion, and wherein the seal portion includes a pair of seal tips sealed against the insert adapter to provide a fluid seal between the base housing and the insert adapter, wherein the base housing comprises a receiving aperture receiving at least a portion of the insert adapter, an upper flange, a lower flange, and a plurality of projections extending upwardly from the upper flange and an upper surface of the base housing, the plurality of projections configured to extend into a plurality of apertures formed in the insert adapter to facilitate preventing relative rotation between the base housing and the insert adapter, and wherein the insert adapter comprises a lower adapter portion coupled to the base housing and having an inner rim and an outwardly extending flange, the inner rim defining the sensor insertion aperture, and the outwardly extending flange extending radially outward of the inner rim, an upper adapter portion coupled to the vapor pressure sensor and having an upper surface, a clip extending outwardly from the upper surface of the insert adapter, the clip configured to engage the vapor pressure sensor to maintain coupling between the vapor pressure sensor and the insert adapter, and an anti-rotation tab extending outwardly from the upper surface of the insert adapter, the anti-rotation tab configured to abut against the vapor pressure sensor when the vapor pressure sensor is coupled to the insert adapter to facilitate preventing relative rotation between the vapor pressure sensor and the insert adapter.

In another aspect, a method of manufacturing a sensor adapter assembly configured to couple to a vehicle fuel tank is provided. The method includes forming an insert adapter defining a sensor insertion aperture configured to provide fluid communication to a space inside the fuel tank, coupling a seal to the insert adapter, and overmolding a base housing about the seal and at least a portion of the insert adapter.

In addition to the foregoing, the described method may include one or more of the following features: welding the base housing to the fuel tank about an aperture in the fuel tank such that the sensor insertion aperture is in fluid communication with the space inside the fuel tank, and coupling a vapor pressure sensor to the insert adapter such that at least a portion of the vapor pressure sensor extends through the sensor insertion aperture and is disposed within the space inside the fuel tank.

BRIEF DESCRIPTION OF THE DRAWINGS

The present disclosure will become more fully understood from the detailed description and the accompanying drawings, wherein:

FIG. 4 is a perspective view of a portion of the vapor pressure sensor assembly shown in FIG. 2;

FIG. 5 is a bottom view of the assembly portion shown in FIG. 4;

FIG. 6 is an example retention feature that may be used with the vapor pressure sensor assembly shown in FIG. 2.

DETAILED DESCRIPTION

Figure 1:
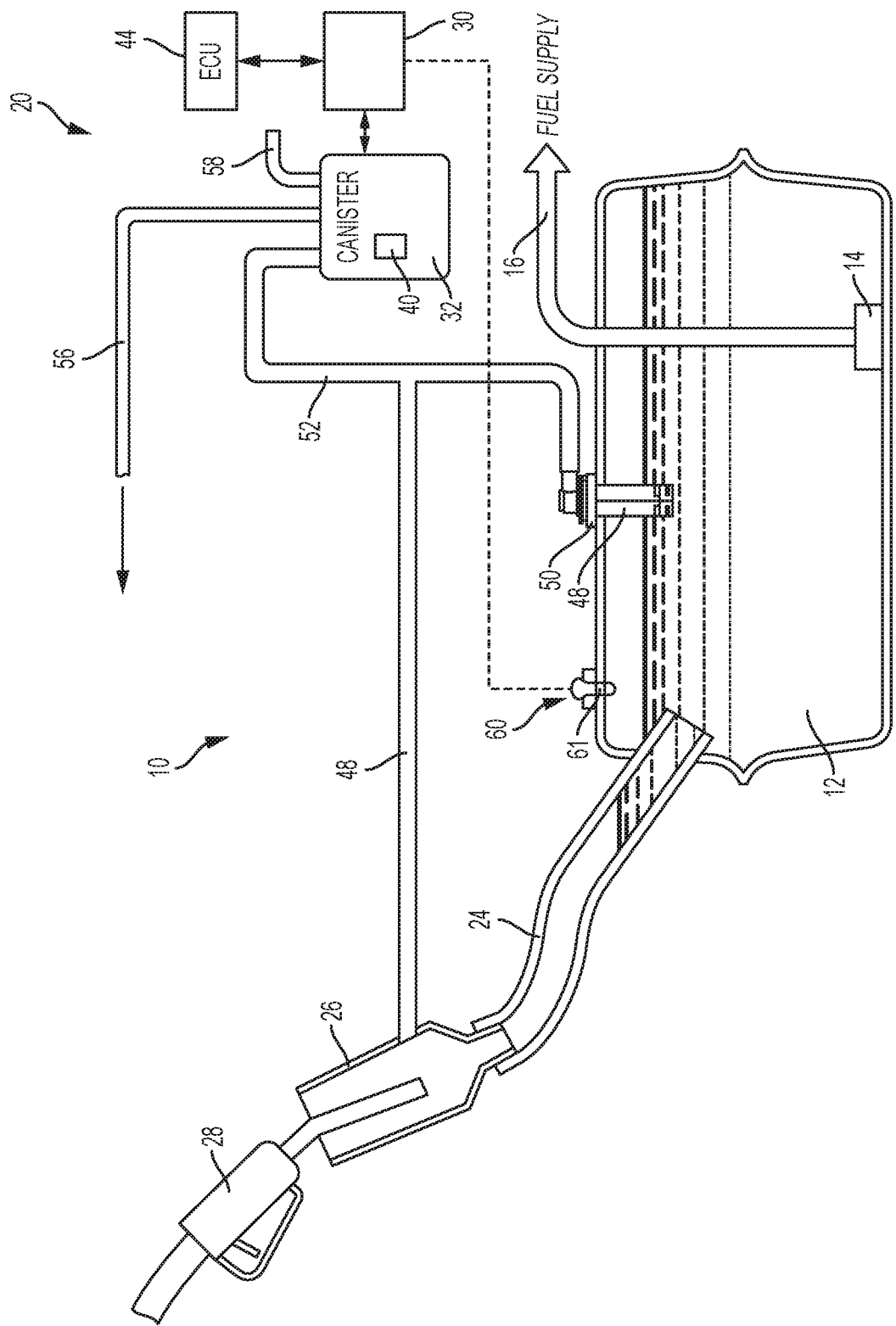
FIG. 1 is a schematic illustration of a fuel tank system having a vapor pressure sensor assembly in accordance with one example of the present disclosure.

With initial reference to FIG. 1, a fuel tank system constructed in accordance to one example of the present disclosure is shown and generally identified at reference number 10. The fuel tank system 10 can generally include a fuel tank 12 configured as a reservoir for holding fuel to be supplied to an internal combustion engine via a fuel delivery system, which includes a fuel pump 14. The fuel pump 14 can be configured to deliver fuel through a fuel supply line 16 to a vehicle engine (not shown). An evaporative emissions control system 20 can be configured to recapture and recycle fuel vapor emitted from the fuel tank 12. As will become appreciated from the following discussion, the evaporative emissions control system 20 manages the complete evaporative system for a vehicle. The fuel tank 12 includes a filler neck 24 attached thereto with a generally enlarged upper end 26 to receive a refueling filler nozzle 28 during a refueling event.

The control system 20 includes a controller or control module 30, a vapor canister 32, and a canister health sensing assembly 40. In general and as will be described herein, the control module 30 can further include or receive inputs from the canister health sensing assembly 40. The control module 30 can receive the inputs from the canister health sensing assembly 40 based on a unit of measurement, such as temperature, to estimate the health of the vapor canister 32. "Health" as used herein can be any unit of measurement that relates to performance of the vapor canister 32. For example, the health can be related to units of hydrocarbon stored in the vapor canister 32. The canister health sensing assembly 40 is configured to measure an operating characteristic of the vapor storage canister. The control module 30 can be in signal communication with a vehicle electronic control unit 44. The control system 20 with the canister health sensing assembly 40 can function as an on-board diagnostics (OBD) tool that provides information regarding the life of the vapor canister 32.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

The fuel tank 12 includes a vent valve 48 disposed in the top wall thereof through an access opening and has a flange 50 thereon registered against the exterior surface of the tank top for attachment thereto and sealing therearound in a manner known in the art. The outlet of the valve 48 is connected through a conduit 52 to the inlet of the vapor canister 32. The vapor canister 32 further includes a purge line 56 connected thereto which is adapted for connection to the air inlet of an engine (not shown) for enabling flow of vapor therethrough upon engine startup. An atmospheric air inlet 58 is provided in the vapor canister 32 to provide purge flow of air into the vapor canister 32 upon engine startup.

The fuel tank 12 further includes a vapor pressure sensor assembly 60 disposed in the top wall thereof through another access opening 61. With further reference to FIGS. 2-7, the vapor pressure sensor assembly 60 generally includes a base housing 62, a seal 64, an insert adapter 66, and a vapor pressure sensor 68. The base housing 62, seal 64, and/or insert adapter 66 can together form a sensor adapter that can be coupled to the fuel tank 12 about the access opening 61. Vapor pressure sensor 68 can then be coupled to the sensor adapter to enable sensing of the vapor pressure within fuel tank 12. Vapor pressure sensor 68 can be in signal communication with controller 30.

Figure 3:
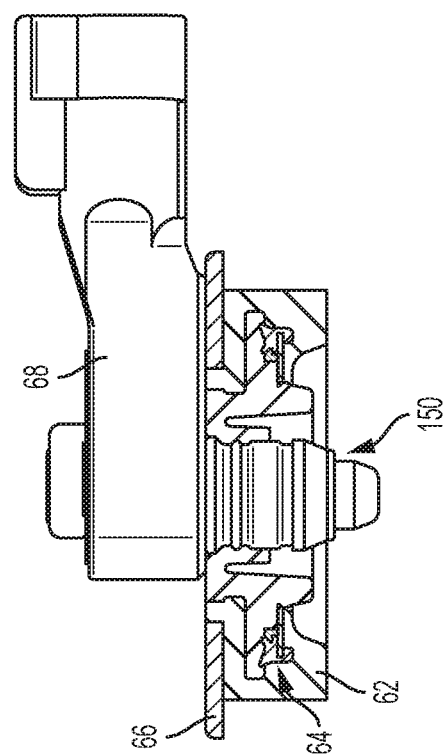
FIG. 3 is a partial sectional view of the vapor pressure sensor assembly shown in FIG. 1.
Figure 7:
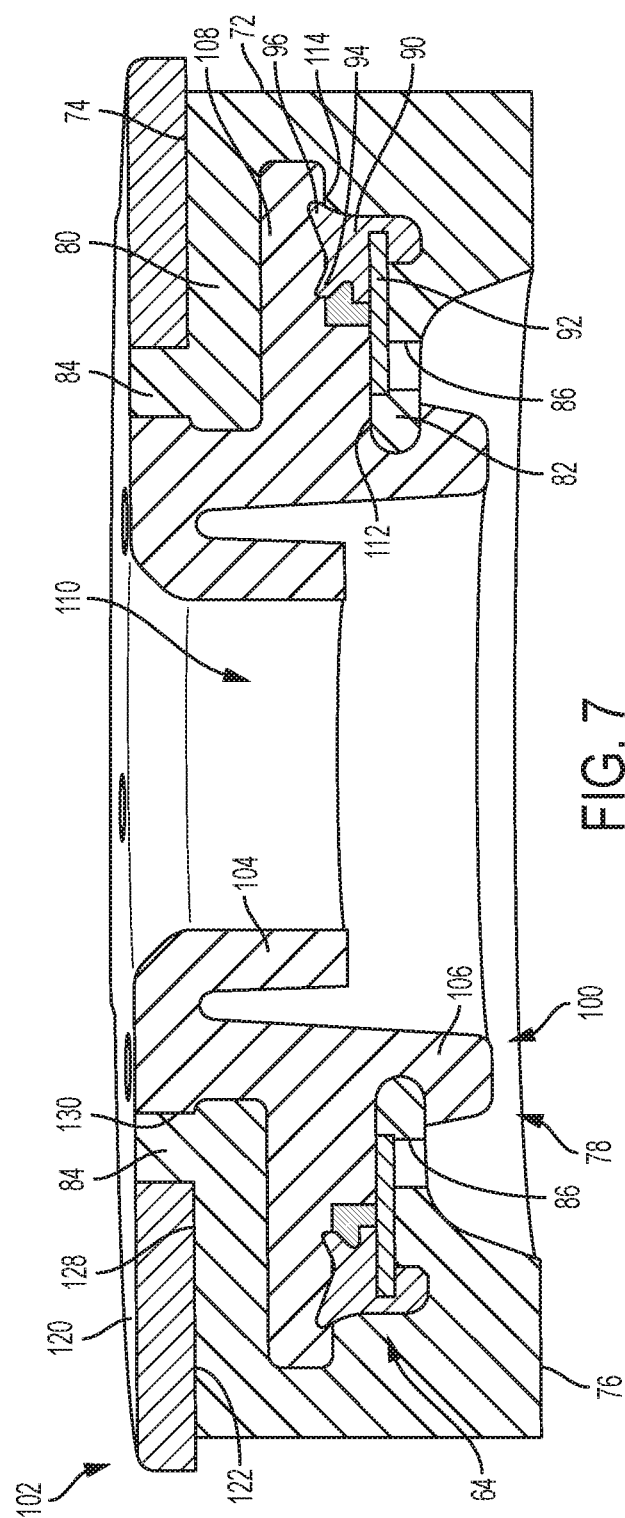
FIG. 7 is a cross-sectional view of the assembly portion shown in FIG. 4 and taken along line 7-7.

With further reference to FIGS. 3 and 7, in the example embodiment, base housing 62 is generally cylindrical and is overmolded over seal 64 and insert adapter 66. Base housing 62 can include an outer wall 72, an upper surface 74, and a lower surface 76. Base housing 62 can define a receiving aperture 78 configured to receive insert adapter 66, an upper flange 80, and a lower flange 82. A plurality of pins or projections 84 can be formed extending upwardly from the upper flange 80 and upper surface 74. Projections 84 are configured to extend at least partially into insert adapter 66 to facilitate preventing relative rotation between base housing 62 and insert adapter 66, as well as to prevent air pockets forming between base housing 62 and insert adapter 66. Moreover, as shown in FIG. 4, projections 84 can be disposed in a generally circular arrangement. A plurality of apertures 86 (see FIGS. 5 and 7) are formed in lower flange 82.

In one example, base housing 62 is fabricated from a polymer such as a high-density polyethylene. However, base housing 62 may be fabricated from any suitable material that enables vapor pressure sensor assembly 60 to function as described herein. In the example embodiment, base housing 62 is configured to be welded to fuel tank 12. However, base housing 62 may be coupled to fuel tank 12 using any suitable method, for example, via fasteners or thermal welding.

With further reference to FIG. 7, in the example embodiment, seal 64 generally includes a seal portion 90 coupled to or overmolded over a plate portion 92. The seal 64 is configured to couple to insert adapter 66 before base housing 62 is overmolded over both seal 64 and insert adapter 66. As such, seal 64 provides a fluid seal between base housing 62 and insert adapter 66. In one example, seal portion 90 is fabricated from a polymer such as a fluorocarbon, and plate portion 92 is fabricated from a metal or metal alloy such as stainless steel. However, seal portion 90 and plate portion 92 may be fabricated from any suitable material that enables vapor pressure sensor assembly 60 to function as described herein.

Moreover, horizontal motion of seal 64 (as shown in FIG. 7) is restricted by insert adapter 66 and overmolded base housing 62, compression of the tips 94, 96 of seal 64 is regulated by step height when the mold closes, the two seal tips 94, 96 provide redundant sealing for reduced permeation, and seal 64 is compressed from the molding pressure when base housing 62 is overmolded. In one example, seal 64 may be constructed in accordance with commonly owned U.S. patent Ser. No. 14/580,459, the contents of which are incorporated herein by reference.

With continued reference to FIGS. 3 and 7, insert adapter 66 generally includes a lower adapter portion 100 coupled to an upper adapter portion 102. Lower adapter portion 100 is configured to couple to base housing 62 (e.g., by overmolding), and upper adapter portion 102 is configured to couple to vapor pressure sensor 68. In one example, insert adapter 66 is fabricated from a polymer such as AMODEL. However, insert adapter 66 may be fabricated from any suitable material that enables assembly 60 to function as described herein.

In the example embodiment, lower adapter portion 100 can include an inner flange or rim 104, a shoulder portion 106, and an outwardly extending flange 108. The inner rim 104 defines a sensor insertion aperture 110 configured to receive at least a portion of vapor pressure sensor 68, as shown in FIG. 3. Shoulder portion 106 can define a recess 112 configured to receive base housing lower flange 82, and outwardly extending flange 108 can be disposed between the upper and lower flanges 80, 82 of the base housing 62. Moreover, outwardly extending flange 108 can include a lower surface 114 configured to abut against seal portion 90.

In the example embodiment, upper adapter portion 102 can generally include an upper surface 120, a lower surface 122, an anti-rotation tab 124, and a clip 126 (see FIG. 4).

Figure 2:
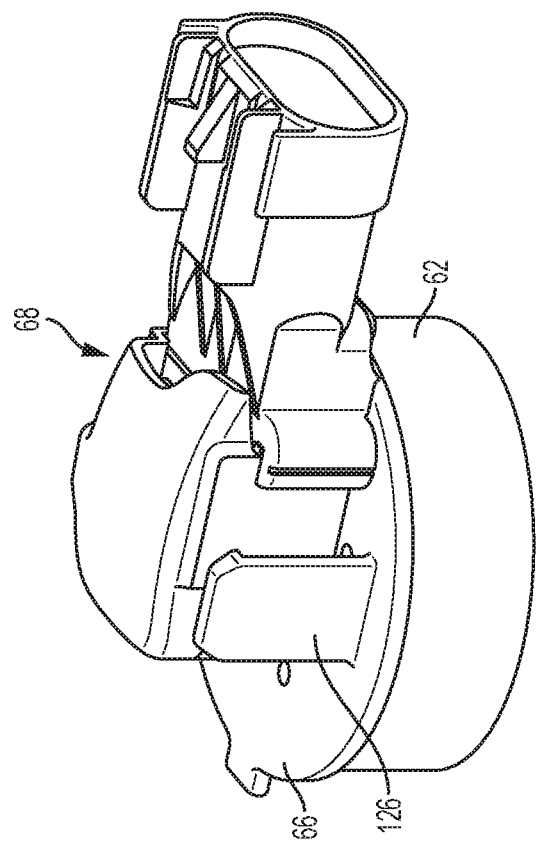
FIG. 2 is a perspective view of an example vapor pressure sensor assembly that may be used with the system shown in FIG. 1.

As shown in FIGS. 2 and 3, upper adapter portion 102 is configured to receive vapor pressure sensor 68 such that the sensor rests or abuts upon upper surface 120, as shown in FIGS. 3, 7, and 14. Lower surface 122 is configured to face and/or abut an upper surface 128 of base housing upper flange 80. A plurality of apertures 130 can be formed through upper adapter portion 102 and configured to receive base housing projections 84 to facilitate coupling between base housing 62 and insert adapter 66 as well as preventing relative rotation therebetween.

As illustrated in FIG. 4, anti-rotation tab 124 extends upwardly from upper surface 120 and can include a first wall 132 and a second wall 134. Vapor pressure sensor 68 is configured to abut against at least a portion of anti-rotation tab 124 to facilitate preventing rotation of vapor pressure sensor 68 when the sensor is coupled to insert adapter 66. In the illustrated example, tab 124 is generally L-shaped. However, anti-rotation tab 124 can have various shapes and configurations to enable tab 124 to abut against various shaped vapor pressure sensors.

As illustrated in FIG. 4, clip 126 can extend upwardly from upper surface 120 and can include a vertical portion 136 with a retention feature 138 formed at a distal end 140 of the vertical portion 136. When vapor pressure sensor 68 is coupled to insert adapter 66, clip 126 is configured to bend or flex outwardly to enable portions of sensor 68 to move downwardly onto insert adapter 66. Clip 126 subsequently automatically bends or flexes inwardly once sensor 68 is assembled to thereby position retention feature 138 over or about a portion of sensor 68 to maintain coupling between vapor pressure sensor 68 and insert adapter 66. In this way, vapor pressure sensor 68 can be quickly coupled to insert adapter 66 in its proper orientation once base housing 62 is welded to fuel tank 12.

In an alternative arrangement shown in FIG. 5, clip 126 can further include a rib 142 and an additional anti-rotation tab 144. Rib 142 can be coupled to upper surface 120 and configured to provide additional structural integrity to clip 126. The additional anti-rotation tab 144 can be configured to abut against at least a portion of vapor pressure sensor 68 to facilitate preventing rotation of sensor 68 when the sensor is coupled to insert adapter 66.

As shown in FIG. 4, upper adapter portion 102 can include opposed alignment tabs 146 configured to facilitate alignment of base housing 62 and insert adapter 66 in a welding tool (not shown) for welding of the base housing 62 to the fuel tank 12.

As shown in FIG. 3, vapor pressure sensor 68 can be coupled to insert adapter 66 such that a probe 150 extends through sensor insertion aperture 110 and seals against inner rim 104. In this way, probe 150 is disposed within fuel tank 12 to determine a vapor pressure therein.

One example method of manufacturing vapor pressure sensor assembly 60 includes forming insert adapter 66, for example, by an injection molding process. Seal 64 is coupled to insert adapter 66, and insert adapter 66 is subsequently placed in a mold. Base housing 62 is overmolded over seal 64 and insert adapter 66 to thereby couple base housing 62 to the insert adapter 66. Base housing 62 may be subsequently coupled to the upper surface of fuel tank 12, for example by a welding process. Vapor pressure sensor 68 may then be coupled to the insert adapter 66.

Described herein are systems and methods for coupling a vapor pressure sensor directly to a fuel tank. The system includes a vapor pressure sensor adapter configured to enable the vapor pressure sensor to couple to the fuel tank. The adapter includes a base housing coupled to an insert adapter. The base housing is coupled (e.g., welded) to the fuel tank, and the insert adapter is configured to receive a vapor pressure sensor. The insert adapter includes features to couple the sensor thereto, as well as features to prevent relative rotation between the sensor and the insert adapter. Accordingly, the system provides a sensor adapter that can be welded to the exterior of the fuel tank such that the fuel vapor pressure sensor can be coupled directly thereto.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A sensor adapter assembly configured to couple a vapor pressure sensor to a fuel tank, the assembly comprising:
a base housing configured to couple to the fuel tank;
an insert adapter coupled to the base housing, the insert adapter defining a sensor insertion aperture configured to provide fluid communication to a space inside the fuel tank; and
a clip extending outwardly from an upper surface of the insert adapter, the clip configured to engage the vapor pressure sensor to maintain coupling between the vapor pressure sensor and the insert adapter;
wherein the insert adapter is configured to couple to the vapor pressure sensor such that at least a portion of the vapor pressure sensor extends through the sensor insertion aperture into the space inside the fuel tank.

2. The assembly of claim 1, further comprising an anti-rotation tab extending outwardly from an upper surface of the insert adapter, the anti-rotation tab configured to abut against the vapor pressure sensor when the vapor pressure sensor is coupled to the insert adapter to facilitate preventing relative rotation between the vapor pressure sensor and the insert adapter.

3. The assembly of claim 1, wherein the base housing is overmolded over at least a portion of the insert adapter.

4. The assembly of claim 3, wherein a seal is coupled to the insert adapter and the base housing is overmolded over the seal.

5. The assembly of claim 4, wherein the seal includes a seal portion overmolded over a plate portion, and wherein the seal portion includes a pair of seal tips sealed against the insert adapter to provide a fluid seal between the base housing and the insert adapter.

6. The assembly of claim 1, wherein the base housing comprises:
a receiving aperture receiving at least a portion of the insert adapter;
an upper flange; and
a lower flange.

7. The assembly of claim 6, wherein the base housing further comprises a plurality of projections extending upwardly from the upper flange and an upper surface of the base housing, the plurality of projections configured to extend into a plurality of apertures formed in the insert adapter to facilitate preventing relative rotation between the base housing and the insert adapter.

8. The assembly of claim 1, wherein the insert adapter comprises:
a lower adapter portion coupled to the base housing and having an inner rim and an outwardly extending flange, the inner rim defining the sensor insertion aperture, and the outwardly extending flange extending radially outward of the inner rim; and
an upper adapter portion configured to couple to the vapor pressure sensor.

9. A method of manufacturing a sensor adapter assembly configured to couple to a vehicle fuel tank, comprising:
forming an insert adapter defining a sensor insertion aperture configured to provide fluid communication to a space inside the fuel tank;
coupling a seal to the insert adapter; and
overmolding a base housing about the seal and at least a portion of the insert adapter.

10. The method of claim 9, further comprising:
welding the base housing to the fuel tank about an aperture in the fuel tank such that the sensor insertion aperture is in fluid communication with the space inside the fuel tank; and
coupling a vapor pressure sensor to the insert adapter such that at least a portion of the vapor pressure sensor extends through the sensor insertion aperture and is disposed within the space inside the fuel tank.

11. A sensor adapter assembly configured to couple a vapor pressure sensor to a fuel tank, the assembly comprising:
a base housing configured to couple to the fuel tank;
an insert adapter coupled to the base housing, the insert adapter defining a sensor insertion aperture configured to provide fluid communication to a space inside the fuel tank; and
an anti-rotation tab extending outwardly from an upper surface of the insert adapter, the anti-rotation tab configured to abut against the vapor pressure sensor when the vapor pressure sensor is coupled to the insert adapter to facilitate preventing relative rotation between the vapor pressure sensor and the insert adapter;
wherein the insert adapter is configured to couple to the vapor pressure sensor such that at least a portion of the vapor pressure sensor extends through the sensor insertion aperture into the space inside the fuel tank.

12. The assembly of claim 11, further comprising a clip extending outwardly from an upper surface of the insert adapter, the clip configured to engage the vapor pressure sensor to maintain coupling between the vapor pressure sensor and the insert adapter.

13. The assembly of claim 11, wherein the base housing is overmolded over at least a portion of the insert adapter.

14. A sensor adapter assembly configured to couple a vapor pressure sensor to a fuel tank, the assembly comprising:
  a base housing configured to couple to the fuel tank;
  an insert adapter coupled to the base housing, the insert adapter defining a sensor insertion aperture configured to provide fluid communication to a space inside the fuel tank, wherein the base housing is overmolded over at least a portion of the insert adapter;
  wherein the insert adapter is configured to couple to the vapor pressure sensor such that at least a portion of the vapor pressure sensor extends through the sensor insertion aperture into the space inside the fuel tank.

15. The assembly of claim 14, wherein a seal is coupled to the insert adapter and the base housing is overmolded over the seal.

16. The assembly of claim 15 wherein the seal includes a seal portion overmolded over a plate portion, and wherein the seal portion includes a pair of seal tips sealed against the insert adapter to provide a fluid seal between the base housing and the insert adapter.

17. A sensor adapter assembly configured to couple a vapor pressure sensor to a fuel tank, the assembly comprising:
  a base housing configured to couple to the fuel tank; and
  an insert adapter coupled to the base housing, the insert adapter defining a sensor insertion aperture configured to provide fluid communication to a space inside the fuel tank, the insert adapter further including:
    a lower adapter portion coupled to the base housing and having an inner rim and an outwardly extending flange, the inner rim defining the sensor insertion aperture, and the outwardly extending flange extending radially outward of the inner rim; and
    an upper adapter portion configured to couple to the vapor pressure sensor;
  wherein the insert adapter is configured to couple to the vapor pressure sensor such that at least a portion of the vapor pressure sensor extends through the sensor insertion aperture into the space inside the fuel tank.

* * * * *